United States Patent
Kraus

[11] 3,751,965
[45] Aug. 14, 1973

[54] RESISTANCE HEATER GRAPHITE TEST CAPSULE

[75] Inventor: Thaddaus Kraus, Furstentum, Liechtenstein

[73] Assignee: Balzers Patent und Beteiligungs Aktiengesellschaft, Balzers, Furstentum, Liechtenstein

[22] Filed: July 6, 1971

[21] Appl. No.: 159,837

[30] Foreign Application Priority Data
July 15, 1970 Switzerland.................. 10790/70

[52] U.S. Cl............................ 73/19, 13/20, 219/427
[51] Int. Cl. ........................................ G01n 7/00
[58] Field of Search.................. 73/19; 219/427; 13/20, 23, 25

[56] References Cited
UNITED STATES PATENTS
1,981,015  11/1934  Williams................. 219/427
2,749,424  6/1956  Dieterich................. 13/25
2,945,756  7/1960  Ballantine................ 13/25
3,371,142  2/1968  Soller.................... 219/427

FOREIGN PATENTS OR APPLICATIONS
461,141  10/1968  Switzerland................ 219/20

*Primary Examiner*—Herbert Goldstein
*Attorney*—John J. McGlew et al.

[57] ABSTRACT

A test capsule of a graphite material which includes a cylindrical bottom part and a cover which is engageable over the bottom part and which includes either a spherical engagement surface which is engageable with a partially spherical engagement surface of the bottom part or a conical surface of the bottom part. The cover and the bottom part are provided with ring-shaped ends which are engageable by electrodes for supplying current therethrough for resistance heating thereof in order to heat the sample within the cylindrical bottom part container.

2 Claims, 3 Drawing Figures

PATENTED AUG 14 1973  3,751,965

INVENTOR.
THADDÄUS KRAUS

BY

John J. McGlew

ATTORNEY

3,751,965

RESISTANCE HEATER GRAPHITE TEST CAPSULE

BACKGROUND OF THE INVENTION

1. Field of the Invention

This invention relates in general to devices employed for the examination of samples particularly for the analytical determination of their gas content and in particular to a new and useful resistance-heater test capsule made of graphite which includes a lower cylindrical part and a cover having either spherical or conical engagement surfaces.

2. Description of the Prior Art

The present invention is used in the examination of samples, particularly for the analytical determination of their gas content. A method is known where the sample to be examined is enclosed in a small container made of a graphite material which is clamped between two electrodes and which is heated by resistance heating by the passage of direct current therethrough. The gases given off during the heating of the sample diffuse through the container wall and are fed to a measuring instrument for determination of their type and amount. A device of this type is described in detail in U.S. Pat. No. 3,683,699 dated Aug. 15, 1972.

For this testing purpose there is employed a two-part test capsule which comprises a lower part and a cover. If the cover and the lower part do not have precise dimensions they can be exactly interengaged. The engageable surface dimensions can vary for example, when the parts are warped by the pressing of the coal powder during the graphitization, or if the clamping electrodes are not accurately aligned. This causes difficulties due to the fact that either the electric contact between the damped ends of the capsule and the electrode becomes defective, or that the two parts of the capsule no longer close tightly. In the first case the effect is excessive heating at the contact points with the result of uneven heating of the capsule. In this other case in which the parts do not close tightly a part of the test melt can escape through the opening between the parts. Both yield errors in the measuring result.

SUMMARY OF THE INVENTION

The present invention overcomes the difficulty of the prior art by providing a capsule which includes a cylindrical bottom part which interengages with a cover and wherein the engagement surfaces are either partially spherical or conical. A test capsule which is made of graphite is constructed so that it can be clamped between two current supply electrodes and heated by direct current passage. By making the engagement surfaces of the two parts either conical or spherical they may be pivoted relative to each other during the closing. This pivotability permits the lower part and the cover to hug the clamping electrodes tightly during the clamping and even if they are not accurately aligned insures a jointless seal in each position between the cover part and the capsule body. In addition, the use of a cover with a closing surface in the form of a partial spherical surface compensates the unavoidable inaccuracies in the manufacture of the capsule. Even if the parts are warped during the graphitization, this has only a minor effect.

Accordingly it is an object of the invention to provide an improved capsule for determining the gas content of materials which includes a graphite cylindrical capsule which is closed by a cover of graphite and which are constructed to be engaged by current electrodes for the passage of a current therethrough, and which includes engagement surfaces which are either spherical or conical so that they may be moved relative to each other during the clamping in order to maintain a tight interengagement and closing of the capsule.

A further object of the invention is to provide a test capsule which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

IN THE DRAWING

GENERAL DESCRIPTION OF THE PREFERRED EMBODIMENTS

Figure 1:
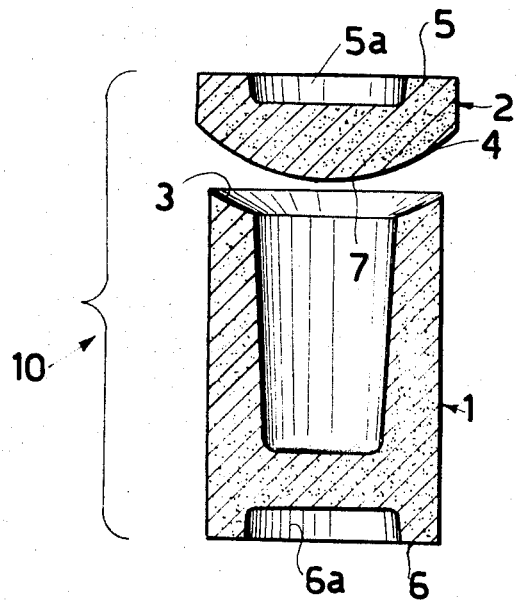
FIG. 1 is an exploded sectional view of a capsule constructed in accordance with the invention.
Figure 2:
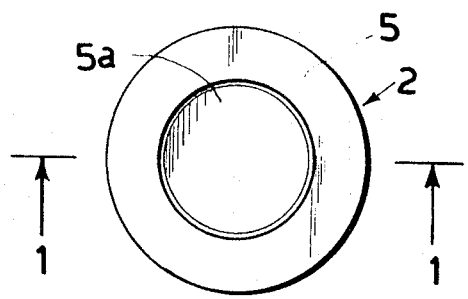
FIG. 2 is a top plan view of a capsule and cover shown in FIG. 1.

Referring to the drawings in particular the invention embodied therein in FIGS. 1 and 2 comprises a capsule generally designated 10 which includes a lower part or cylindrical receptacle 1 and a top part or cover 2. The lower part 1 and the top part 2 include engagement surfaces 3 and 4 which in the embodiment of FIGS. 1 and 2 are made with spherically shaped surfaces of the same radius of curvature so that when they interengage one part can be pivoted relative to the other without the tight closing connection being broken. The top part 2 includes an annular flange 5 and the bottom part 1 includes an annular flange 6 moving clamping ends which are engaged with electrodes for the passing of a heating current through the electrodes into the capsule which is closed in operation.

The two spherical form surfaces provide during the closing of the capsule an areal seal, providing a particularly reliable seal. It can be seen that it suffices if only the surface portions of the lower part and the cover coming in contact with each other represent parts of spherical surfaces. The central portion 7 of the surface of the cover facing the capsule in the closed state which does not come in contact with the lower part can therefore be flat if desired.

It is not necessary that the two parts of the capsule have the usual form of the larger lower part and a smaller cover, as is shown in FIGS. 1 and 2. Rather the separating surfaces between the two parts can also be arranged in the proximity of the center plane of the cylindrical capsule. For example: the two halves of the capsule can be produced first by pressing as graphite parts of the same form and size, and the spherical surfaces can then be obtained by milling or grinding. This way there is obtained a capsule which may close exactly. In addition, the costs are reduced in the production of the graphite parts when they are made of equal form and size, since only one pressing tool is employed.

In the embodiments of FIGS. 1 and 2, the ends 5 and 6 are of ring-shaped form. A central depression 5a, 6a are formed in cover 2 and in the receptacle respectively. This insures that the heat flow through the clamping element is reduced. However plane contact surfaces without depressions can also be used if desired.

Figure 3:
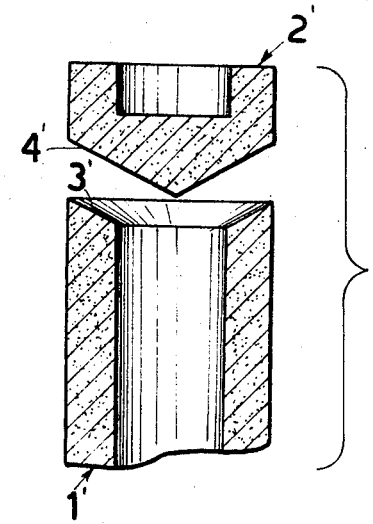
FIG. 3 is an exploded view similar to FIG. 1 of another embodiment of the invention.

As indicated in FIG. 3 the contacting surfaces 3' and 4' may be made conical for capusles having a bottom part 1' and a cover 2'.

As closing surfaces have been designated within the framework of this specification the surface portions of the lower part 1 and the cover 2 facing each other form a jointless seal during the closing of the capsule. As the embodiments show the closing surfaces need not be the same as the contact surfaces. It suffices rather that if the closing surfaces touch each other at several points, for example, along a closed sealing line in such a way that a tight seal for the test melt is obtained it is sufficient.

While specific embodiments of the invention have been shown and described in detail to illustrate the application of the principles of the invention, it will be understood that the invention may be embodied otherwise without departing from such principles.

What is claimed is:

1. A test capsule made of a graphite material for examining samples according to a hot extraction method comprising a lower cylindrical part and a cover, said cover and said lower cylindrical part having means at their outer end for clamping these parts between current supply electrodes for being heated by current passage therethrough, said cover and said lower part having smooth relatively slideable engagement surfaces with each of said engagement surfaces being spherical, said cover being rotatable about the axis of said cylindrical part and being tiltable about an axis perpendicular thereto to permit the movement of said parts to effect centering and closing contact between the engagement surfaces.

2. A test capsule made of a graphite material for examining samples according to a hot extraction method wherein the capsule is clamped between electrodes and comprises an electrical resistance heater, comprising a cylindrical graphite container having a closed end with an end wall having an exterior face with a central recess and an encircling rim around the recess defining a first electrode connection end, said container having an opposited opened end with a rim defining a spherical engagement surface, a cover having a spherical engagement surface engaged on said rim in pivotal sliding engagement with the surface of said rim, said cover having an opposite exterior face with a second electrode connection, said cover being rotatable about the axis of said container and also being tiltable with respect to the axis of said container in order to permit the container and the cover to adapt themselves to the position of the clamping electrodes whereby to facilitate an improved current flow therethrough.

* * * * *